United States Patent
Kim et al.

(10) Patent No.: US 9,377,913 B2
(45) Date of Patent: Jun. 28, 2016

(54) DISPLAY APPARATUS INCLUDING TOUCH ELECTRODE

(71) Applicant: LG Display Co., Ltd., Seoul (KR)

(72) Inventors: Tae Hwan Kim, Goyang-si (KR); Yong Chan Park, Seoul (KR); Sang Soo Hwang, Seoul (KR); Jin Woo Park, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/140,240

(22) Filed: Dec. 24, 2013

(65) Prior Publication Data
US 2014/0210774 A1    Jul. 31, 2014

(30) Foreign Application Priority Data
Jan. 30, 2013   (KR) .......................... 10-2013-0010383

(51) Int. Cl.
*G06F 3/044*     (2006.01)
*G06F 3/041*     (2006.01)

(52) U.S. Cl.
CPC .............. *G06F 3/044* (2013.01); *G06F 3/0412* (2013.01)

(58) Field of Classification Search
None
See application file for complete search history.

(56) References Cited

U.S. PATENT DOCUMENTS

| | | | |
|---|---|---|---|
| 2008/0062139 A1* | 3/2008 | Hotelling | G02F 1/13338 345/173 |
| 2009/0046077 A1* | 2/2009 | Tanaka et al. | 345/174 |
| 2010/0156827 A1* | 6/2010 | Joo et al. | 345/173 |
| 2010/0194707 A1* | 8/2010 | Hotelling et al. | 345/173 |
| 2011/0291977 A1* | 12/2011 | Moriwaki | 345/173 |
| 2012/0306797 A1* | 12/2012 | Misaki | G06F 3/0412 345/173 |
| 2012/0313881 A1* | 12/2012 | Ge | G02F 1/13338 345/174 |
| 2013/0044074 A1* | 2/2013 | Park et al. | 345/174 |
| 2013/0082954 A1* | 4/2013 | Azumi et al. | 345/173 |
| 2013/0181942 A1* | 7/2013 | Bulea et al. | 345/174 |
| 2014/0071066 A1* | 3/2014 | Lee et al. | 345/173 |

* cited by examiner

*Primary Examiner* — Kent Chang
*Assistant Examiner* — Nathan Brittingham
(74) *Attorney, Agent, or Firm* — Fenwick & West LLP (57) ABSTRACT

Disclosed is a display apparatus which facilitates to improve touch sensitivity by decreasing parasitic capacitance between a common electrode and gate/data lines, and decreasing delay on touch sensing and displaying driving, wherein the display apparatus may include a lower panel including a pixel electrode; an upper panel including the common electrode, wherein the common electrode together with the pixel electrode forms an electric field for displaying an image for a displaying driving mode, and the common electrode senses a capacitance change in accordance with a user's touch for a touch sensing mode; and a liquid crystal layer of VA mode formed between the lower and upper panels, and changed in accordance with the electric field between the pixel and common electrodes.

16 Claims, 5 Drawing Sheets

FIG. 1

RELATED ARTS

DISPLAY APPARATUS INCLUDING TOUCH ELECTRODE

CROSS REFERENCE TO RELATED APPLICATIONS

This application claims priority under 35 U.S.C. §119(a) from Korean Patent Application No. 10-2013-0010383 filed on Jan. 30, 2013, which is hereby incorporated by reference as if fully set forth herein.

BACKGROUND

1. Field of the Disclosure

Embodiments of the present invention relate to a display apparatus including a touch electrode.

2. Discussion of the Related Art

A liquid crystal display (LCD) device displays images by controlling a light transmittance of liquid crystal through the use of electric field. To this end, the LCD device may include a liquid crystal panel with a plurality of pixels arranged in a matrix configuration, and a driver for driving the liquid crystal panel.

The liquid crystal panel may include a lower substrate, an upper substrate, and a liquid crystal layer between the lower and upper substrates. According to whether or not the electric field is applied, the light transmittance is controlled by alignment of the liquid crystal layer, to thereby display images.

The related art LCD device generally uses an input means such as mouse or keyboard. However, in case of navigation, mobile phone, and household appliances, a touch screen is widely applied, which allows a user to input information by directly touching a screen with a finger, a pen or the like while a user looks at the screen.

Hereinafter, the related art LCD device will be described with reference to the accompanying drawings.

Figure 1:
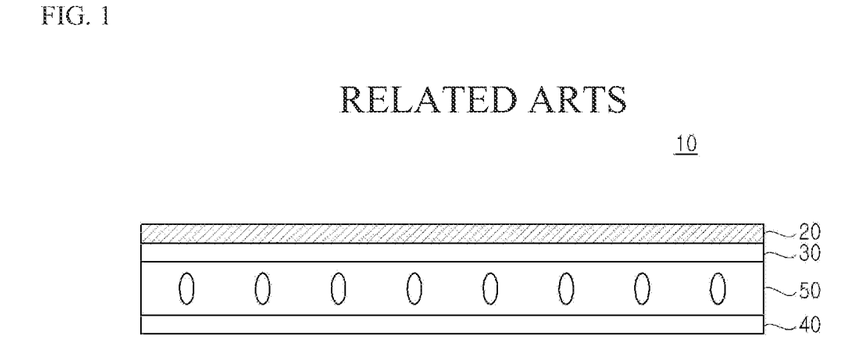
FIG. 1 is a cross sectional view briefly illustrating a related art LCD device with an on-cell type touch panel.

FIG. 1 is a cross sectional view briefly illustrating a related art LCD device with an on-cell type touch panel.

As shown in FIG. 1, an LCD device 10 includes a touch panel 20, an upper substrate 30, a lower substrate 40, and a liquid crystal layer 50.

The touch panel 20 may be configured in an on-cell type to be attached to an upper surface of the upper substrate 30. The panel, which is attached to the upper surface of the upper substrate 30, for sensing a user's touch, is referred to as the on-cell touch panel.

Although not shown, the upper substrate 30 may include a color filter, a polarizing plate, and a cover glass.

The lower substrate 400 may include a pixel defined by crossing gate and data lines, and a switching transistor included in the pixel.

The liquid crystal layer 500 is controlled in its alignment in accordance with the change of electric field, whereby the light transmittance is controlled, to thereby display images.

However, the related art LCD device 10 with the on-cell touch panel may have the following disadvantages.

First, the additional touch panel 20 is provided on the upper substrate 30, whereby the LCD device 10 is increased in its volume.

Also, it is difficult to realize slimness in the LCD device 10 due to the additionally-provided touch panel 20.

Accordingly, it is needed to develop the LCD device with the new type of touch panel capable of realizing slimness.

SUMMARY

Accordingly, embodiments of the present invention are directed to a display apparatus that substantially obviate one or more problems due to limitations and disadvantages of the related art.

An aspect of embodiments of the present invention is directed to provide a display apparatus capable of sensing a user's touch through the use of common electrode formed on an upper substrate in a VA (vertical alignment) mode.

Additional advantages and features of embodiments of the invention will be set forth in part in the description which follows and in part will become apparent to those having ordinary skill in the art upon examination of the following or may be learned from practice of embodiments of the invention. The objectives and other advantages of embodiments of the invention may be realized and attained by the structure particularly pointed out in the written description and claims hereof as well as the appended drawings.

To achieve these and other advantages and in accordance with the purpose of embodiments of the invention, as embodied and broadly described herein, there is provided a display apparatus that may include a lower panel including a pixel electrode in a pixel region defined by crossing gate and data lines; an upper panel including a common electrode, wherein the common electrode together with the pixel electrode forms an electric field so as to display an image for a displaying driving mode, and the common electrode senses a capacitance change in accordance with a user's touch for a touch sensing mode; and a liquid crystal layer of vertical alignment (VA) mode formed between the upper panel and the lower panel, wherein the liquid crystal layer is changed in accordance with the electric field formed between the pixel electrode and the common electrode.

At this time, the common electrode may include a touch sensing electrode (RX), formed by patterning the common electrode in a column direction, for sensing the capacitance change in accordance with a user's touch; and a touch driving electrode (TX) which is formed by patterning the common electrode in column and row directions and thus positioned between the touch sensing electrode and another touch sensing electrode, and is supplied with a touch driving signal for sensing a user's touch.

In addition, the display apparatus may include a touch sensing line extending from one end of the column direction of the touch sensing electrode; a touch driving line extending in the column direction from one end of the row direction of the upper panel, the touch driving line for connecting the touch driving electrode and another touch driving electrode in the row direction; and a touch driver, which is connected with the touch sensing line and touch driving line, for applying the touch driving signal to the touch driving electrode, and sensing the capacitance change in accordance with a user's touch from the touch sensing electrode.

Furthermore, the display apparatus may include a touch sensing line extending from one end of the column direction of the touch sensing electrode; a touch driving line extending from the touch driving electrode in the column direction, the touch driving line electrically connecting the touch driving electrode and another touch driving electrode both of which are arranged in a same row, in the row direction at one end of the column direction of the upper panel; and a touch driver, connected with the touch sensing line and touch driving line, for applying the touch driving signal to the touch driving electrode, and sensing the capacitance change from the touch sensing electrode.

Also, the common electrode may further include a plurality of touch sensing blocks, formed by patterning the common electrode in the column and row directions, for sensing a user's touch.

The upper panel may include a light-shielding portion, formed on an upper substrate, for preventing light leakage; a color filter, formed on the light-shielding portion, for representing colors by filtering light being incident from the lower panel; the common electrode formed on the color filter; a first insulating layer formed on the common electrode; and a touch wiring formed on the first insulating layer and positioned in the region overlapped with the light-shielding portion.

The upper panel may include a light-shielding portion, formed on an upper substrate, for preventing light leakage; a color filter, formed on the light-shielding portion, for representing colors by filtering light being incident from the lower panel; a touch wiring formed on the color filter and positioned in the region overlapped with the light-shielding portion; a first insulating layer formed on the touch wiring; and the common electrode formed on the first insulating layer.

The upper panel may include a light-shielding portion, formed on the upper substrate, for preventing light leakage; the common electrode formed on the light-shielding portion; a color filter, formed on the common electrode, for representing colors by filtering light being incident from the lower panel; a first insulating layer formed on the color filter; and a touch wiring formed on the first insulating layer and positioned in the region overlapped with the light-shielding portion.

At this time, one end of the touch wiring is connected with any one of a touch driving electrode, touch sensing electrode and touch sensing block, which are formed by patterning the common electrode, and the other end of the touch wiring is connected with a touch driver for sensing a user's touch.

Also, the display apparatus may include a timing controller for driving one frame by a time-division method so as to alternately drive the displaying driving mode for displaying an image on the display panel and the touch sensing mode for sensing a user's touch for one frame period.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, a display apparatus including a touch electrode according to embodiments of the present invention will be described in detail with reference to the accompanying drawings.

On explanation about the embodiments of the present invention, if it is mentioned that a first element is positioned "on or above" a second structure, it should be understood that the first and second elements may be brought into contact with each other, or a third element may be interposed between the first and second elements.

According to a method for controlling an alignment of liquid crystal layer, a display apparatus may have various modes, for example, Twisted Nematic (TN) mode, Vertical Alignment (VA) mode, In-Plane Switching (IPS) mode, Fringe Field Switching (FFS) mode, and etc.

Among the above modes, in case of the IPS mode and the FFS mode, both a pixel electrode (pixel ITO) and a common electrode (Vcom) are formed on a lower substrate, whereby liquid crystal molecules included in a liquid crystal layer are aligned by an electric field between the pixel electrode and the common electrode. Thus, the IPS mode and the FFS mode may correspond to a method using an In-Plane Switching type electric field.

A display apparatus including a touch electrode according to embodiments of the present invention may be applied to a liquid crystal display (LCD) device including a pixel electrode on a lower substrate, and a common electrode on an upper substrate, as shown in the TN mode and VA mode.

Also, a display apparatus including a touch electrode according to embodiments of the present invention may be applied to an in-cell touch type LCD device which senses a user's touch by patterning a common electrode.

Hereinafter, a display apparatus according to the first embodiment of the present invention will be described as follows.

Figure 2:
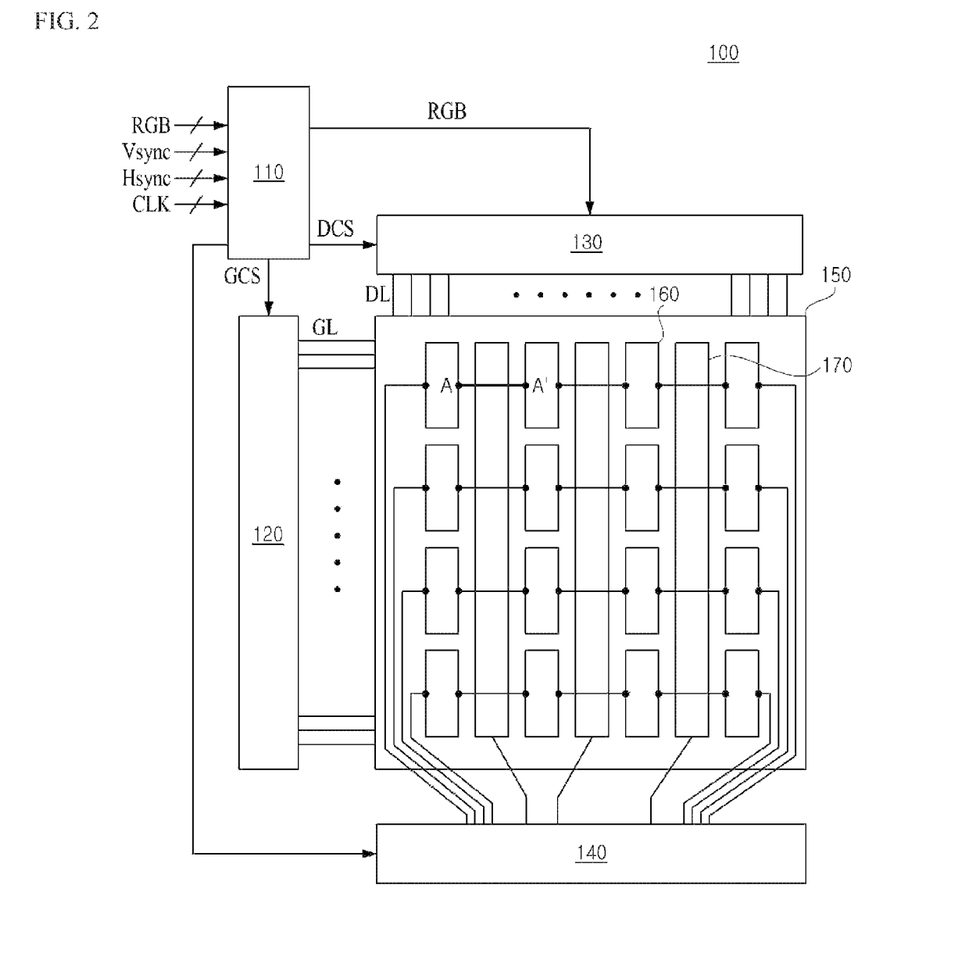
FIG. 2 illustrates a display apparatus according to the first embodiment of the present invention.

FIG. 2 illustrates a display apparatus according to the first embodiment of the present invention.

As shown in FIG. 2, the display apparatus according to the first embodiment of the present invention may include a timing controller 110, a gate driver 120, a data driver 130, a touch driver 140, a display panel 150, a touch driving electrode 160, and a touch sensing electrode 170.

The timing controller 110 drives one frame period by a time-division method so that a displaying driving mode for displaying an image on the display panel 150 and a touch sensing mode for sensing a user's touch are alternately driven for one frame period.

For the displaying driving mode, the timing controller 110 aligns an externally-provided video signal, converts the aligned video signal into digital video data (R, G, B) in a unit of frame, and supplies the digital video data (R, G, B) to the data driver 130.

For the displaying driving mode, the timing controller 110 generates a gate control signal (GCS) for controlling the gate driver 120 and a data control signal (DCS) for controlling the data driver 130 by the use of externally-provided vertical synchronous signal (Vsync), horizontal synchronous signal (Hsync), and clock signal (CLK).

The generated gate control signal (GCS) is supplied to the gate driver 120, and the generated data control signal (DCS) is supplied to the data driver 130.

The data control signal (DCS) may include a source start pulse (SSP), a source sampling clock (SSC), a source output enable (SOE), and a polarity control signal (POL).

The gate control signal (GCS) may include a gate start pulse (GSP), a gate shift clock (GSC), and a gate output enable (GOE).

The timing controller 110 drives one frame period by the time-division method so that the displaying driving mode (hereinafter, referred to as 'display mode, DM') for displaying an image on the display panel 150 and the touch sensing mode (hereinafter, referred to as 'touch mode, TM') for sensing a user's touch are alternately driven for one frame period.

The display mode (DM) is a mode for displaying a desired image on the display panel 150, and the touch mode (TM) is a mode for sensing a location touched by a user on the display panel 150.

A maintenance time of the touch mode (TM) is relatively shorter than a maintenance time of the display mode (DM). That is, the touch mode (TM) is driven for a short time period between each of the display modes (DM), whereby there is no influence on picture quality of the image displayed on the display panel 150. According to one embodiment of the present invention, the maintenance time of the touch mode (TM) is about 1/10, 1/40 or less in comparison to the maintenance time of the display mode (DM).

The gate driver 120 turns on a switching device connected with a gate line to be displayed with an image for the display mode (DM). According to one embodiment of the present invention, the gate driver 120 receives a signal from the timing controller 110, and applies a gate high voltage (VGH) to the gate line, to thereby turn on the switching device.

When the switching device connected with the gate line is turned-on, the data driver 130 outputs display data to a data line. In this case, the display data may be a grayscale value with grayscale information to display an image.

The touch driver 140 is connected with a touch sensing line and a touch driving line. The touch driver 140 applies a touch driving signal to the touch driving electrode 160, and senses a capacitance change in accordance with a user's touch from the touch sensing electrode 170.

Hereinafter, the display panel 150 will be described in detail with reference to FIGS. 3 to 6.

Figure 3:
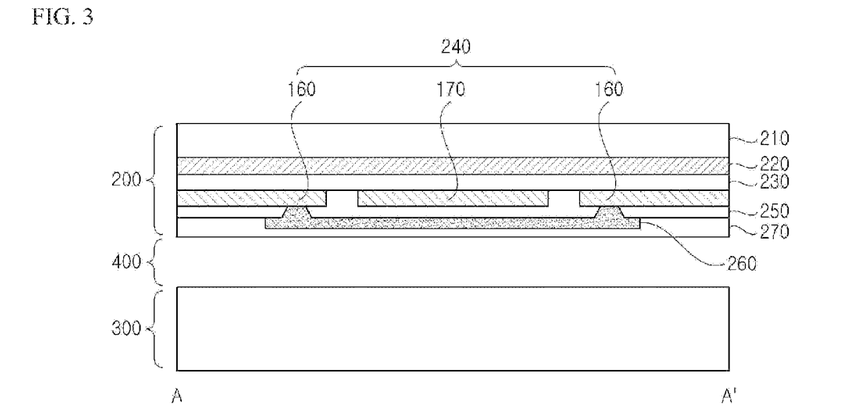
FIG. 3 is a cross sectional view along A-A' of the display apparatus according to the first embodiment of the present invention.

FIG. 3 is a cross sectional view along A-A' of the display apparatus according to the first embodiment of the present invention.

As shown in FIG. 3, the display panel 150 may include an upper panel 200, a lower panel 300, and a liquid crystal layer 400.

According to one embodiment of the present invention, the upper panel 200 may include an upper substrate 210, a light-shielding portion 220 on the upper substrate 210, a color filter 230 on the light-shielding portion 220, a common electrode 240 on the color filter 230, a first insulating layer 250 on the common electrode 240, a touch wiring 260 on the first insulating layer 250, and a second insulating layer 270 on the touch wiring 260.

For the display mode (DM), the common electrode 240 together with the pixel electrode forms an electric field, to thereby display an image. For the touch mode (TM), the common electrode 240 senses the capacitance change in accordance with a user's touch.

The common electrode 240 may include the touch sensing electrode 170 (RX) which is formed by patterning the common electrode 240 in a column direction so as to sense the capacitance change in accordance with a user's touch; and the touch driving electrode 160 (TX) which is formed by patterning the common electrode 240 in column and row directions, positioned between each of the touch sensing electrodes 170, and applied with the touch driving signal for sensing a user's touch.

The touch wiring 260 electrically connects the plurality of touch driving electrodes 160 by a through hole in the row direction. The touch driving electrodes 160 are provided at a predetermined interval with the first insulating layer 250 interposed there between.

Hereinafter, various examples of the upper panel 200 will be described with reference to FIGS. 4 to 6.

Figure 4:
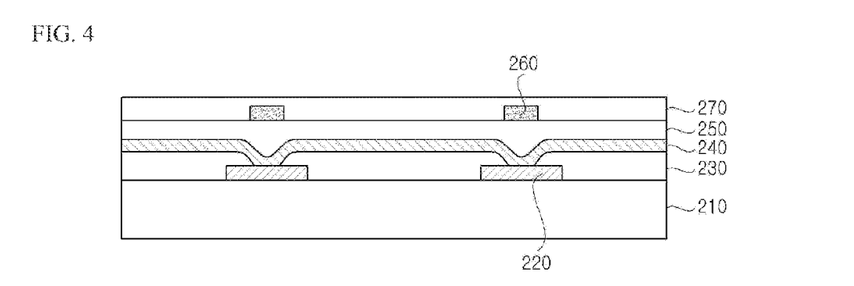
FIG. 4 illustrates a first example of an upper panel included in the display apparatus according to the present invention.

FIG. 4 illustrates the first example of the upper panel included in the display apparatus according to the present invention.

As shown in FIG. 4, the upper panel 200 may include an upper substrate 210, a light-shielding portion 220, a color filter 230, a common electrode 240, a first insulating layer 250, a touch wiring 260, and a second insulating layer 270.

The upper substrate 210 is formed of a transparent material, for example, glass or plastic.

The light-shielding portion 220 is positioned in the region corresponding to the boundaries of the color filter 230, to thereby prevent light leakage in the region where the alignment of liquid crystal layer 400 is not controlled. The light-shielding portion 220 may be used as a black matrix (BM).

The color filter 230 is formed on the light-shielding portion 220, wherein the color filter 230 filters light being incident from the lower panel, to thereby represent colors.

According to one embodiment of the present invention, the color filter 230 may include red, green and blue color filters. The color filter 230, which is formed on the light-shielding portion 220, transmits only the light with a specific wavelength range.

The common electrode 240 is formed on the color filter 230. For the display mode (DM), the common electrode 240 together with the pixel electrode forms an electric field, to thereby display an image. For the touch mode (TM), the common electrode 240 senses the capacitance change in accordance with a user's touch.

The first insulating layer 250 is formed on the common electrode 240 so as to electrically insulate the common electrode 240 and the touch wiring 260 from each other.

The first insulating layer 250 planarizes the surface, and also enhances an adhesive strength with the common electrode 240.

The touch wiring 260 is formed on the first insulating layer 250, and more particularly, positioned in the region overlapped with the light-shielding portion 220.

The touch wiring 260 may be electrically brought into contact with some parts of the common electrode 240 patterned in the predetermined region as shown in FIG. 3.

The touch wiring 260 may be used as touch driving and touch sensing lines. That is, one end of the touch wiring 260 may be connected with a touch driving electrode formed by patterning the common electrode 240, and the other end of the touch wiring 260 may be connected with the touch driver for sensing a user's touch, and used as the touch driving line. Also, one end of the touch wiring 260 may be connected with a touch sensing electrode formed by patterning the common electrode 240, and the other end of the touch wiring 260 may be connected with the touch driver for sensing a user's touch, and used as the touch sensing line.

The second insulating layer 270 is formed on the touch wiring 260, to thereby protect the touch wiring 260.

Figure 5:
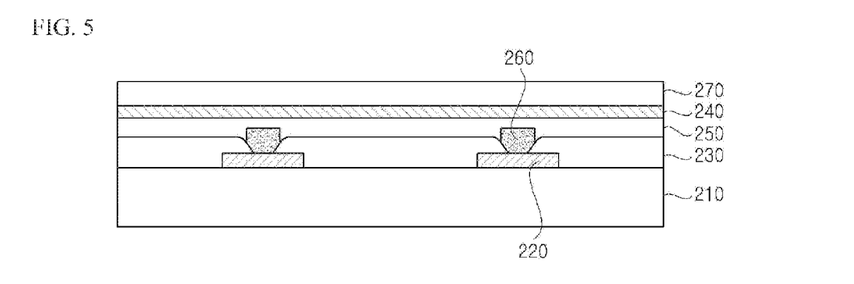
FIG. 5 illustrates a second example of an upper panel included in the display apparatus according to the present invention.

FIG. 5 illustrates the second example of the upper panel included in the display apparatus according to the present invention.

As shown in FIG. 5, the upper panel 200 may include an upper substrate 210, a light-shielding portion 220, a color filter 230, a common electrode 240, a first insulating layer 250, a touch wiring 260, and a second insulating layer 270.

The upper substrate 210 is formed of a transparent material, for example, glass or plastic.

The light-shielding portion 220 is positioned in the region corresponding to the boundaries of the color filter 230, to thereby prevent light leakage in the region where the alignment of liquid crystal layer 400 is not controlled. The light-shielding portion 220 may be used as a black matrix (BM).

The color filter 230 is formed on the light-shielding portion 220, wherein the color filter 230 filters light being incident from the lower panel, to thereby represent colors.

According to one embodiment of the present invention, the color filter 230 may include red, green and blue color filters. The color filter 230, which is formed on the light-shielding portion 220, transmits only the light with a specific wavelength range.

The touch wiring 260 is formed on the color filter 230, and more particularly, positioned in the region overlapped with the light-shielding portion 220.

The touch wiring 260 may be electrically brought into contact with some parts of the common electrode 240 patterned in the predetermined region as shown in FIG. 3.

The touch wiring 260 may be used as touch driving and touch sensing lines. That is, one end of the touch wiring 260 may be connected with a touch driving electrode formed by patterning the common electrode 240, and the other end of the touch wiring 260 may be connected with the touch driver for sensing a user's touch, and used as the touch driving line. Also, one end of the touch wiring 260 may be connected with a touch sensing electrode formed by patterning the common electrode 240, and the other end of the touch wiring 260 may be connected with the touch driver for sensing a user's touch, and used as the touch sensing line.

The first insulating layer 250 is formed on the touch wiring 260 so as to electrically insulate the common electrode 240 and the touch wiring 260 from each other.

The first insulating layer 250 planarizes the surface, and also enhances an adhesive strength with the common electrode 240.

The common electrode 240 is formed on the first insulting layer 250. For the display mode (DM), the common electrode 240 together with the pixel electrode forms an electric field, to thereby display an image. For the touch mode (TM), the common electrode 240 senses the capacitance change in accordance with a user's touch.

The second insulating layer 270 is formed on the common electrode 240, to thereby protect the common electrode 240.

Figure 6:
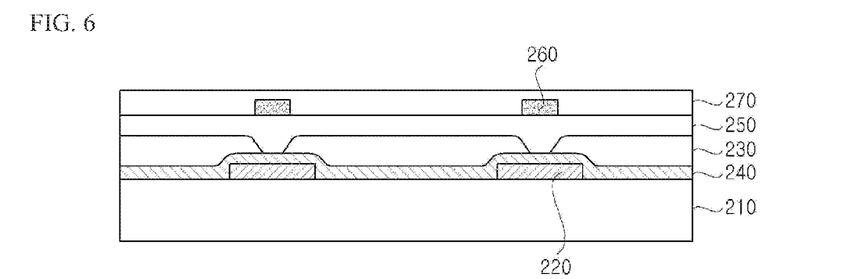
FIG. 6 illustrates a third example of an upper panel included in the display apparatus according to the present invention.

FIG. 6 illustrates the third example of the upper panel included in the display apparatus according to the present invention.

As shown in FIG. 6, the upper panel 200 may include an upper substrate 210, a light-shielding portion 220, a color filter 230, a common electrode 240, a first insulating layer 250, a touch wiring 260, and a second insulating layer 270.

The upper substrate 210 is formed of a transparent material, for example, glass or plastic.

The light-shielding portion 220 is positioned in the region corresponding to the boundaries of the color filter 230, to thereby prevent light leakage in the region where the alignment of liquid crystal layer 400 is not controlled. The light-shielding portion 220 may be used as a black matrix (BM).

The common electrode 240 is formed on the light-shielding portion 220. For the display mode (DM), the common electrode 240 together with the pixel electrode forms an electric field, to thereby display an image. For the touch mode (TM), the common electrode 240 senses the capacitance change in accordance with a user's touch.

The color filter 230 is formed on the common electrode 240, wherein the color filter 230 filters light being incident from the lower panel, to thereby represent colors.

According to one embodiment of the present invention, the color filter 230 may include red, green and blue color filters. The color filter 230, which is formed on the common electrode 240, transmits only the light with a specific wavelength range.

The first insulating layer 250 is formed on the color filter 230, to thereby electrically insulate the common electrode 240 and the touch wiring 260 from each other. The first insulating layer 250 enables to planarize the surface.

The touch wiring 260 is formed on the first insulating layer 250, and more particularly, positioned in the region overlapped with the light-shielding portion 220.

The touch wiring 260 may be electrically brought into contact with some parts of the common electrode 240 patterned in the predetermined region as shown in FIG. 3.

The touch wiring 260 may be used as touch driving and touch sensing lines. That is, one end of the touch wiring 260 may be connected with a touch driving electrode formed by patterning the common electrode 240, and the other end of the touch wiring 260 may be connected with the touch driver for sensing a user's touch, and used as the touch driving line. Also, one end of the touch wiring 260 may be connected with a touch sensing electrode formed by patterning the common electrode 240, and the other end of the touch wiring 260 may be connected with the touch driver for sensing a user's touch, and used as the touch sensing line.

The second insulating layer 270 is formed on the touch wiring 260, to thereby protect the touch wiring 260.

Referring once again to FIG. 3, on the lower panel 300, there are a plurality of pixel regions defined by crossing a plurality of gate lines and of data lines, and the pixel electrode formed in the pixel region.

Although not shown, on the lower panel 300, there is a pixel array for driving the liquid crystal layer 400.

On the lower panel 300, the plurality of gate lines (GL) are formed perpendicular to the plurality of data lines (DL), thereby defining the plurality of pixels.

According to one embodiment of the present invention, each of the pixels may be configured to include three sub-pixels (red, green and blue sub-pixels) corresponding to the red, green and blue color filters, wherein each sub-pixel may include a thin film transistor (TFT), a storage capacitor (Cst), and the pixel electrode.

The thin film transistor (TFT) may include a gate electrode, an active layer, an insulating layer and a data electrode (source/drain electrodes). In this case, the thin film transistor (TFT) may be configured in a bottom gate structure where the gate electrode is positioned below the active layer, or a top gate structure where the gate electrode is positioned above the active layer.

The pixel electrode (Pixel ITO) is electrically connected with the source electrode of the thin film transistor (TFT) through a predetermined contact, and the sub-pixel is supplied with a data voltage (pixel voltage) in accordance with the video signal.

The liquid crystal layer 400 is formed between the upper panel and the lower panel, wherein the liquid crystal layer 400 is driven in vertical alignment (VA) mode changed by the electric field formed between the pixel electrode and the common electrode.

Referring once again to FIG. 2, the touch driving electrode 160 is formed by patterning the common electrode 240 in column and row directions so that the touch driving electrode 160 is positioned between each of the touch sensing electrodes 170, and the touch driving signal for sensing a user's touch is applied to the touch driving electrode 160.

The touch driving line connects the touch driving electrodes 160 in the row direction, and the touch driving line extending in the column direction from one end of the row direction of the upper panel 200 is connected with the touch driver 140.

The touch sensing electrode 170 is formed by patterning the common electrode 240 in the column direction, to thereby sense the capacitance change in accordance with a user's touch.

The touch sensing line extends from one end of the column direction of the touch sensing electrode 170, and one end of the touch sensing line is connected with the touch driver 140.

Hereinafter, a display apparatus according to the second embodiment of the present invention will be described as follows.

Figure 7:
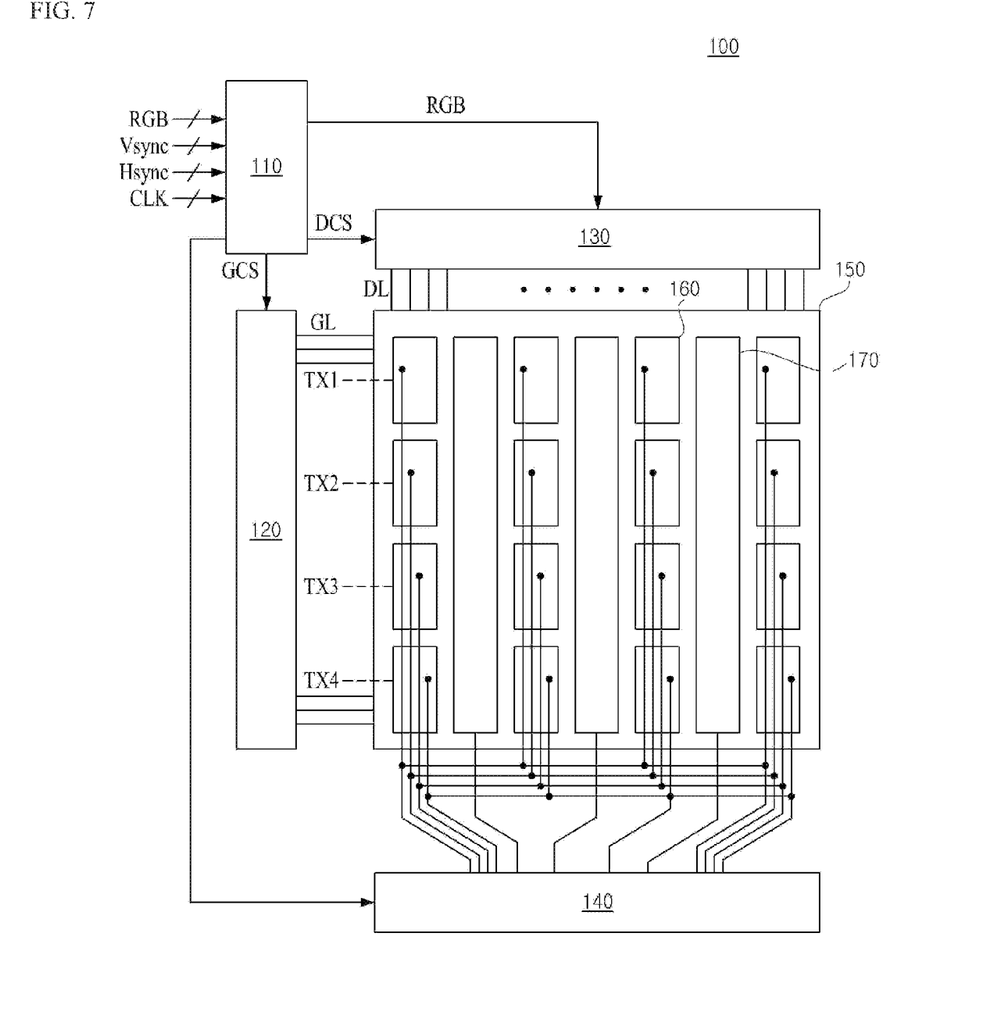
FIG. 7 illustrates a display apparatus according to the second embodiment of the present invention.

FIG. 7 illustrates a display apparatus according to the second embodiment of the present invention.

As shown in FIG. 7, the display apparatus according to the second embodiment of the present invention may include a timing controller 110, a gate driver 120, a data driver 130, a touch driver 140, a display panel 150, a touch driving electrode 160, and a touch sensing electrode 170.

The timing controller 110, the gate driver 120, the data driver 130, the touch driver 140 shown in FIG. 7 is same as the timing controller 110, the gate driver 120, the data driver 130, the touch driver 140 shown in FIG. 2. Thus, the detailed description to the timing controller 110, the gate driver 120, the data driver 130, and the touch driver 140 is omitted.

The display panel 150 has the upper panel shown in FIGS. 4 to 6. Thus, the detailed description to the display panel 150 is omitted.

The touch driving electrode 160 is formed by patterning the common electrode 240 in column and row directions so that the touch driving electrode 160 is positioned between each of the touch sensing electrodes 170, and the touch driving signal for sensing a user's touch is applied to the touch driving electrode 160.

The touch driving line extends from the touch driving electrode 160 in the column direction so that the touch driving electrodes 160 arranged in the same row are connected in the row direction at one end of the column direction of the upper panel 200.

That is, as described with reference to FIG. 7, the four touch driving electrodes (TX1) arranged in the same row are connected in the row direction at one end of the column direction (upper side of '140' of FIG. 7) of the upper panel 200. Also, the four touch driving electrodes (TX2) arranged in the same row are connected in the row direction at one end of the column direction (upper side of '140' of FIG. 7) of the upper panel 200, and the four touch driving electrodes (TX3) arranged in the same row are connected in the row direction at one end of the column direction (upper side of '140' of FIG. 7) of the upper panel 200.

The touch sensing electrode 170 is formed by patterning the common electrode 240 in the column direction, to thereby sense the capacitance change in accordance with a user's touch.

The touch sensing line extends from one end of the column direction of the touch sensing electrode 170, and one end of the touch sensing line is connected with the touch driver 140.

Hereinafter, a display apparatus according to the third embodiment of the present invention will be described as follows.

Figure 8:
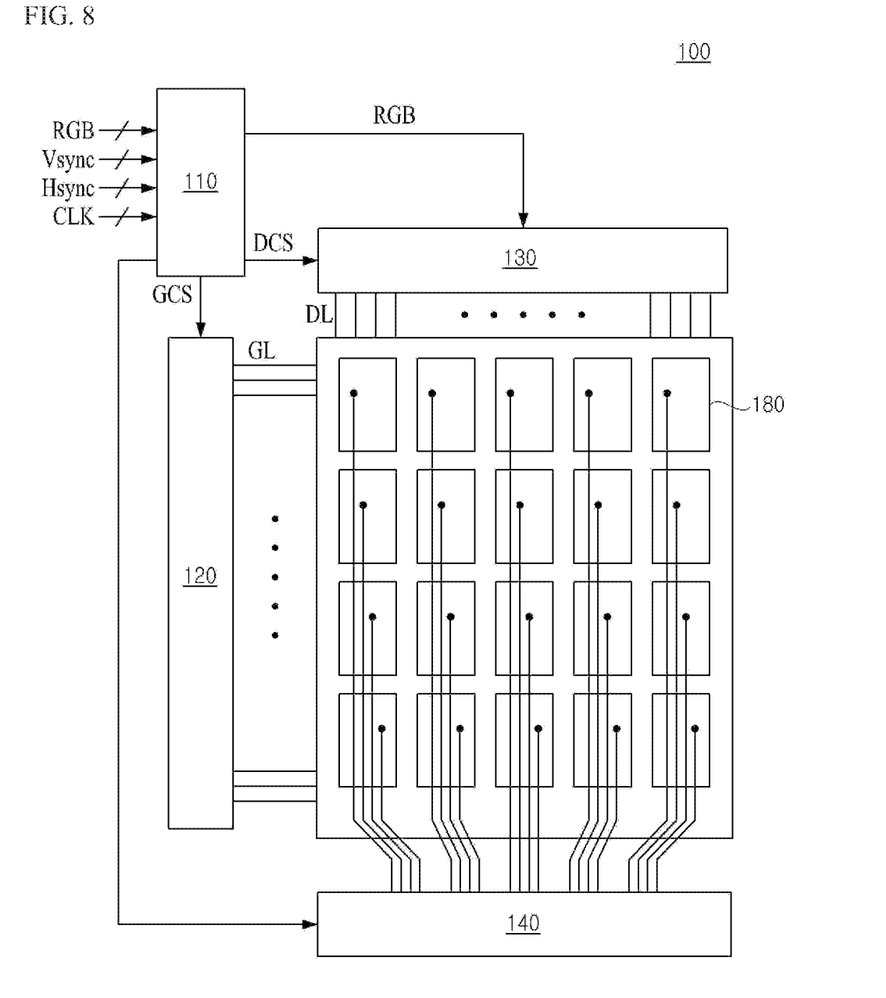
FIG. 8 illustrates a display apparatus according to the third embodiment of the present invention.

FIG. 8 illustrates a display apparatus according to the third embodiment of the present invention.

As shown in FIG. 8, the display apparatus according to the third embodiment of the present invention may include a timing controller 110, a gate driver 120, a data driver 130, a touch driver 140, a display panel 150, and a touch sensing block 180.

The timing controller 110 drives one frame period by a time-division method so that a displaying driving mode for displaying an image on the display panel 150 and a touch sensing mode for sensing a user's touch are alternately driven for one frame period.

For the displaying driving mode, the timing controller 110 aligns an externally-provided video signal, converts the aligned video signal into digital video data (R, G, B) in a unit of frame, and supplies the digital video data (R, G, B) to the data driver 130.

For the displaying driving mode, the timing controller 110 generates a gate control signal (GCS) for controlling the gate driver 120 and a data control signal (DCS) for controlling the data driver 130 by the use of externally-provided vertical synchronous signal (Vsync), horizontal synchronous signal (Hsync) and clock signal (CLK).

Then, the generated gate control signal (GCS) is supplied to the gate driver 120, and the generated data control signal (DCS) is supplied to the data driver 130.

In this case, the data control signal (DCS) may include a source start pulse (SSP), a source sampling clock (SSC), a source output enable (SOE), and a polarity control signal (POL).

The gate control signal (GCS) may include a gate start pulse (GSP), a gate shift clock (GSC), and a gate output enable (GOE).

The timing controller 110 drives one frame period by the time-division method so that the displaying driving mode (hereinafter, referred to as 'display mode, DM') for displaying an image on the display panel 150 and the touch sensing mode (hereinafter, referred to as 'touch mode, TM') for sensing a user's touch are alternately driven for one frame period.

The display mode (DM) is a mode for displaying a desired image on the display panel 150, and the touch mode (TM) is a mode for sensing a location touched by a user on the display panel 150.

According to one embodiment of the present invention, if forming the touch sensing blocks 180 of 'n' columns in the direction parallel to the gate line on the display panel 150, the timing controller 110 alternately drives the display mode (DM) and the touch mode (TM) to be repeated 'n' times so as to sense a user's touch from the touch sensing blocks 180 of all the columns during one frame.

That is, during one frame, the timing controller 110 drives the touch mode (TM1) and the display mode (DM1) in the touch sensing blocks 180 arranged in the first column, drives the touch mode (TM2) and the display mode (DM2) in the touch sensing blocks 180 arranged in the second column, drives the touch mode (TMn−1) and the display mode (DMn−1) in the touch sensing blocks 180 arranged in the n−1th column, and drives the touch mode (TMn) and the display mode (DMn) in the touch sensing blocks 180 arranged in the nth column, thereby controlling the time-division method.

According to one embodiment of the present invention, in case of TFT-LCD display device of XGA grade with 768 gate lines, a TFT turn-on time of the gate line is not more than 21 usec, and a time of one frame is 16.7 msec when it is refreshed at a speed of 60 frames per second. Thus, the touch mode (TM) and the display mode (DM) are alternately repeated in 16.7 msec cycle.

A maintenance time of the touch mode (TM) is relatively shorter than a maintenance time of the display mode (DM).

That is, the touch mode (TM) is driven for a short time period between each of the display modes (DM), whereby there is no influence on picture quality of the image displayed on the display panel 150. According to one embodiment of the present invention, the maintenance time of the touch mode (TM) is about 1/10, 1/40 or less in comparison to the maintenance time of the display mode (DM).

The gate driver 120 turns on a switching device connected with a gate line to be displayed with an image for the display mode (DM). According to one embodiment of the present invention, the gate driver 120 receives a signal from the timing controller 110, and applies a gate high voltage (VGH) to the gate line, to thereby turn on the switching device.

When the switching device connected with the gate line is turned-on, the data driver 130 outputs display data to a data line. In this case, the display data may be a grayscale value with grayscale information to display an image.

The touch driver 140, which is connected with a touch wiring, senses a capacitance change in accordance with a user's touch from the touch sensing block 180, to thereby sense whether or not there is a user's touch, and to sense a touch location.

The display panel has the upper panel shown FIGS. 4 to 6. Thus, the detailed description to the display panel 150 is omitted.

The touch sensing block 180 is formed by patterning the common electrode 240 in column and row directions.

The touch wiring 260 extending from one end of the column direction of the touch sensing block 180 is connected with the touch driver 140.

According to the present invention, a parasitic capacitance is decreased between the common electrode and the gate line and between the common electrode and the data line, whereby a delay on touch sensing and displaying driving is decreased owing to the decreased parasitic capacitance, to thereby improve touch sensitivity.

Also, the touch wiring 260 for connection of the common electrode 240 patterned in an active area is formed in the upper substrate, to thereby improve an aperture ratio.

Also, the touch wiring 260 for connection of the patterned common electrode 240 is formed inside the upper substrate, so that it is possible to reduce a bezel in the panel side, thereby realizing slimness in the display apparatus.

It will be apparent to those skilled in the art that various modifications and variations can be made to embodiments of the present invention without departing from the spirit or scope of the invention. Thus, it is intended that the present invention covers the modifications and variations of this invention provided they come within the scope of the appended claims and their equivalents.

What is claimed is:

1. A display apparatus comprising:
a lower panel including a pixel electrode in a pixel region defined by crossing gate and data lines;
an upper panel including a common electrode, wherein the common electrode together with the pixel electrode forms an electric field so as to display an image for a displaying driving mode, and the common electrode senses a capacitance change in accordance with a user's touch for a touch sensing mode, the common electrode including:
two or more touch sensing electrodes formed by patterning the common electrode in a column direction, for sensing the capacitance change in accordance with the user's touch, and
two or more touch driving electrodes formed by patterning the common electrode in the column direction and a row direction, each of the two or more touch driving electrodes positioned between two of the touch sensing electrodes and supplied with a touch driving signal for sensing the user's touch; and
a liquid crystal layer of vertical alignment (VA) mode formed between the upper panel and the lower panel, wherein the liquid crystal layer is changed in accordance with the electric field formed between the pixel electrode and the common electrode,
wherein the upper panel further includes:
a light-shielding portion, formed on an upper substrate, for preventing light leakage, and
a touch wiring formed in the upper panel in a region overlapped with the light-shielding portion, the touch wiring connected between the two or more touch driving electrodes.

2. The display apparatus of claim 1, wherein the upper panel further includes:
a color filter, formed on the light-shielding portion, for representing colors by filtering light being incident from the lower panel, the common electrode formed on the color filter; and
an insulating layer formed on the common electrode,
wherein the touch wiring is formed on the insulating layer.

3. The display apparatus of claim 1, wherein the upper panel further includes:
a color filter, formed on the light-shielding portion, for representing colors by filtering light being incident from the lower panel; and
an insulating layer formed on the touch wiring, the common electrode formed on the insulating layer,
wherein the touch wiring is formed on the color filter.

4. The display apparatus of claim 1, wherein the upper panel further includes:
a color filter, formed on the common electrode, for representing colors by filtering light being incident from the lower panel, the common electrode formed on the light shielding portion; and
an insulating layer formed on the color filter,
wherein the touch wiring is formed on the insulating layer.

5. The display apparatus of claim 1, further comprising a timing controller for driving one frame by a time-division method so as to alternately drive the displaying driving mode for displaying the image on a display panel and the touch sensing mode for sensing the user's touch for one frame period.

6. The display apparatus of claim 1, wherein the touch wiring comprises a touch sensing line extending from one end of the column direction of a touch sensing electrode of the two or more touch sensing electrodes and a touch driving line extending in the column direction from one end of the row direction of the upper panel, the touch driving line for connecting the two or more touch driving electrodes in the row direction.

7. The display apparatus of claim 6, further comprising:
a touch driver, which is connected with the touch sensing line and the touch driving line, for applying the touch driving signal to one of the touch driving electrodes, and sensing the capacitance change in accordance with the user's touch from one of the touch sensing electrodes.

8. The display apparatus of claim 1, wherein the touch wiring comprises a touch sensing line extending from one end of the column direction of a touch sensing electrode of the touch sensing electrodes and a touch driving line extending from a touch driving electrode of the touch driving electrodes in the column direction, the touch driving line electrically connecting the two or more touch driving electrodes arranged in a same row, in the row direction at one end of the column direction of the upper panel.

9. The display apparatus of claim 8, further comprising:
a touch driver, connected with the touch sensing line and the touch driving line, for applying the touch driving signal to the touch driving electrode, and sensing the capacitance change from the touch sensing electrode.

10. A display apparatus comprising:
a lower panel including a pixel electrode in a pixel region defined by crossing gate and data lines;
an upper panel including:
  a common electrode, the common electrode comprising:
    two or more touch sensing electrodes formed by patterning the common electrode in a column direction, for sensing a capacitance change in accordance with a user's touch for a touch sensing mode, and
    two or more touch driving electrodes formed by patterning the common electrode in the column direction and a row direction, each of the two or more touch driving electrodes positioned between two of the touch sensing electrodes and supplied with a touch driving signal for sensing the user's touch,
  a light-shielding portion, formed on an upper substrate, for preventing light leakage, and
  a touch wiring formed in the upper panel in a region overlapped with the light-shielding portion, the touch wiring connecting one of the touch driving electrodes or one of the touch sensing electrodes with a touch driver; and
a liquid crystal layer between the upper panel and the lower panel.

11. The display apparatus of claim 10, wherein one of the touch sensing electrodes is formed between the touch driving electrodes.

12. The display apparatus of claim 11, wherein the touch driving electrodes are electrically connected to each other through the touch wiring.

13. The display apparatus of claim 10, wherein the upper panel further includes:
a color filter, formed on the light-shielding portion, for representing colors by filtering light being incident from the lower panel, the common electrode formed on the color filter; and
an insulating layer formed on the common electrode,
wherein the touch wiring is formed on the insulating layer.

14. The display apparatus of claim 10, wherein the upper panel further includes:
a color filter, formed on the light-shielding portion, for representing colors by filtering light being incident from the lower panel; and
an insulating layer formed on the touch wiring, the common electrode formed on the insulating layer,
wherein the touch wiring is formed on the color filter.

15. The display apparatus of claim 10, wherein the upper panel further includes:
a color filter, formed on the common electrode, for representing colors by filtering light being incident from the lower panel, the common electrode formed on the light shielding portion; and
an insulating layer formed on the color filter,
wherein the touch wiring is formed on the insulating layer.

16. The display apparatus of claim 10, wherein the common electrode and the pixel electrode form an electric field so as to display an image for a displaying driving mode, and
wherein the liquid crystal layer is chaged in accordance with the electric field formed between the pixel electrode and the common electrode.

* * * * *